July 17, 1951     C. HOPPES     2,560,867
STOPPER

Filed Aug. 25, 1949     2 Sheets-Sheet 1

CARL HOPPES
INVENTOR

BY

ATTORNEY

July 17, 1951  C. HOPPES  2,560,867
STOPPER

Filed Aug. 25, 1949  2 Sheets-Sheet 2

CARL HOPPES
INVENTOR

BY *[signature]*
ATTORNEY

Patented July 17, 1951

2,560,867

UNITED STATES PATENT OFFICE 2,560,867

STOPPER

Carl Hoppes, Ashland, Ohio, assignor to The Faultless Rubber Company, Ashland, Ohio, a corporation of Ohio Application August 25, 1949, Serial No. 112,385

3 Claims. (Cl. 150—8)

My invention relates to stoppers for water bottles or other devices, and the principal object of my invention is to provide a stopper affording enhanced sealing.

In the drawing accompanying this specification and forming a part of this application I have shown for purposes of illustration what I now consider to be the best manner of carrying my invention into practice, and in this drawing.

Figure 1:
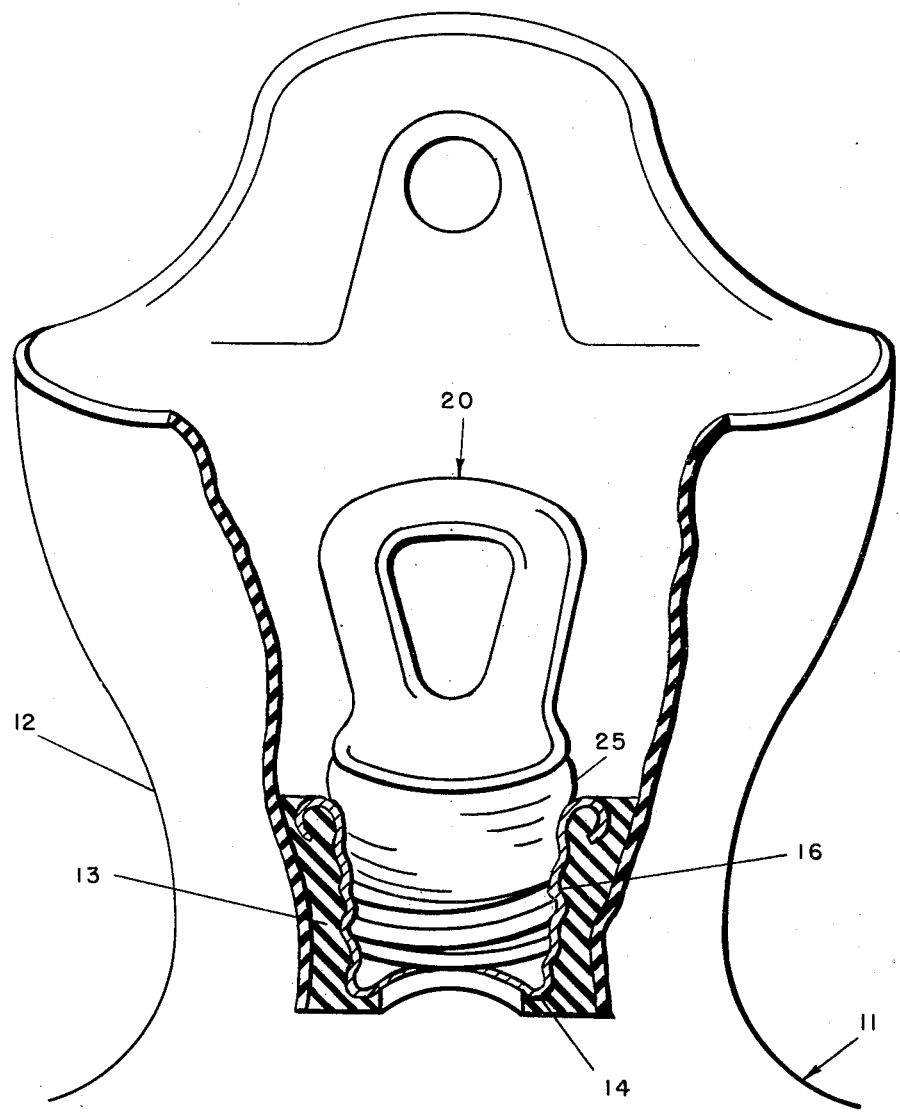
Figure 1 is a view of the upper part of a hot water bottle including the illustrated form of stopper.
Figure 2:
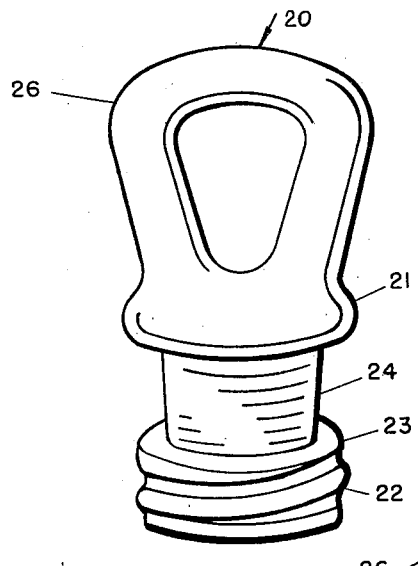
Figure 2 is a general view of the stopper of Figure 1 but omitting the annular washer.
Figure 3:
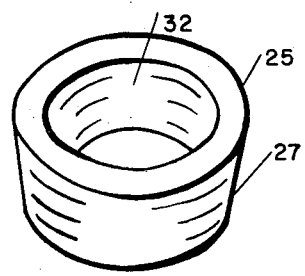
Figure 3 is a general view of the washer.
Figure 4:
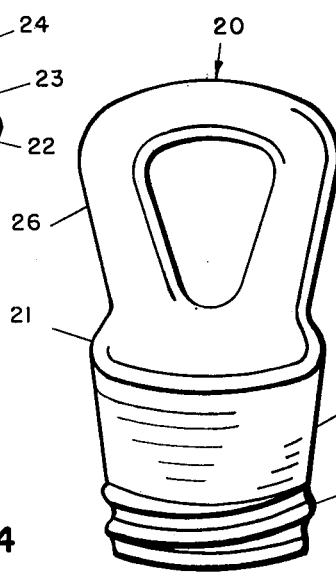
Figure 4 is a general view of the assembled stopper including the washer.

In the drawing I have shown a usual water bottle 11 formed of soft rubber and provided with a mouth 12 in which is secured a relatively stiff rubber block 13 in which is positioned a sheet metal member 14 providing the bottle opening 15 and formed with pressed threads 16 for screw-threadedly receiving the stopper 20.

As herein shown this stopper 20 comprises a body 21 formed of relatively stiff rubber, provided on its inner portion 22 with external screw threads 23 constructed to cooperate with the threads 16 of the sheet metal member 14, provided outwardly of the portion 22 with an annular recess 24 constructed to receive an annular soft rubber washer 25, and provided at its outer end with a suitable grip 26.

Figure 5:
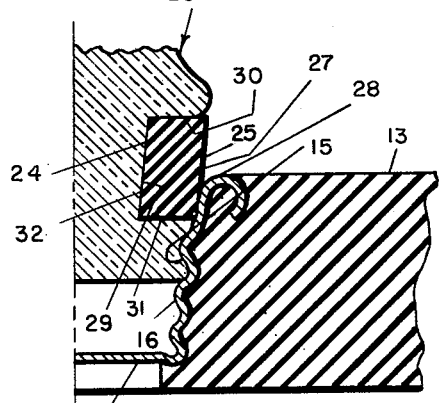
Figure 5 is an enlarged sectional view indicating the relations upon insertion of the stopper into engaging position; and—

As shown in Figure 5, upon insertion of the stopper the outer face 27 of the washer 25 comes into engagement with the outer end 28 of the sheet metal member 14, resulting in a nominal closure of the opening.

Figure 6:
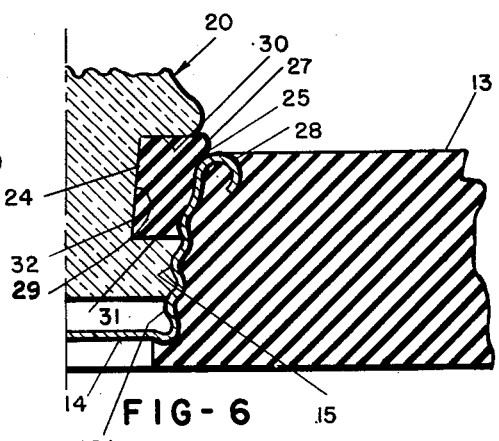
Figure 6 is a view similar to Figure 5 but indicating the relations when the stopper has been further inserted.

However, according to my invention, the bottom 29 and outer side 30 of the recess 24 are disposed an an angle materially greater than ninety degrees, whereby upon further insertion of the stopper, as indicated in Figure 6, the material of the washer 25 is resiliently deformed to substantially overlie the outer end 28 of the member 14 and effect enhanced and satisfactory closure of the opening.

Also according to my invention the further insertion of the stopper is facilitated by forming the washer 25 rotatable in the recess 24, to permit the body 21 upon further insertion of the stopper to turn within the washer 25 and permit the washer 25 to remain stationary relative to the outer end 28 of the member 14, and to facilitate such rotation of the body 21 within the washer 25, the washer 25 is formed of a rubber composition including a material proportion of wax or other suitable material serving perpetually to substantially reduce friction between the body 21 and the washer 25.

As appears from the drawing, in the illustrated embodiment the described angle between the outer side 30 and bottom 29 of the recess 24 is accomplished by disposing the bottom 29 at an angle of approximately fifteen degrees to the axis of the stopper and the outer side 30 approximately perpendicular to the axis of the stopper, thus providing an angle of approximately one hundred and five degrees between the outer side 30 and bottom 29 of the recess 24.

According to present experience, the angle between the outer side 30 and bottom 29 of the recess 24 desirably should not be less than approximately one hundred degrees, also the outer side 30 desirably should not extend at an angle below the perpendicular to the axis of the stopper.

As appears from the drawing, in the present embodiment the inner side 31 of the recess 24 is parallel to the outer side 30, the washer 25 is formed corresponding to the recess 24, and the outer face 27 of the washer 25 is parallel to the inner face 32.

However, it is to be understood that my invention is not limited to the particular embodiment herein shown and described, and I claim as my invention:

1. A stopper for a water bottle or other device having an internally screw threaded opening, comprising a body having a cooperatively externally screw threaded portion and provided outwardly of said portion with an annular recess, and an annular resiliently deformable washer seated in said recess, constructed and arranged upon insertion of said stopper to engage the outer end of such opening, and rotatable relative to said body to facilitate further insertion of said stopper and consequent deformation of said washer into enhanced sealing relation.

2. A stopper for a water bottle or other device having an internally screw threaded opening, comprising a body having a cooperatively externally screw threaded portion and provided outwardly of said portion with an annular recess, and an annular resiliently deformable washer seated in said recess, constructed and arranged upon insertion of said stopper to engage the outer end of such opening, rotatable relative to said body to facilitate further insertion of said stopper and conseqent deformation of said washer into enhanced sealing relation, and impregnated with lubricant to facilitate such rotation.

3. A stopper for a water bottle or other device having an internally screw threaded opening, comprising a body having a cooperatively externally screw threaded portion and provided outwardly of said portion with an annular recess, and an annular resiliently deformable washer seated in said recess, constructed and arranged upon insertion of said stopper to engage the outer end of such opening, rotatable relative to said body to facilitate further insertion of said stopper and consequent deformation of said washer into enhanced sealing relation, and formed of a rubber composition impregnated with wax to facilitate such rotation.

CARL HOPPES.

REFERENCES CITED

The following references are of record in the file of this patent:

UNITED STATES PATENTS

| Number | Name | Date |
|---|---|---|
| 1,080,659 | Schuh | Dec. 9, 1913 |
| 1,382,679 | Schweinert | June 28, 1921 |
| 1,410,237 | Baldwin | Mar. 21, 1922 |
| 1,609,836 | Russell | Dec. 7, 1926 |
| 1,898,658 | Fitterer | Feb. 21, 1933 |
| 2,343,512 | Lobl | Mar. 7, 1944 |